(12) United States Patent
Hartung et al.

(10) Patent No.: US 7,618,595 B2
(45) Date of Patent: Nov. 17, 2009

(54) ASSEMBLY FOR PURIFYING TOXIC GASES FROM PRODUCTION PROCESSES

(75) Inventors: Robert Michael Hartung, Blaubeuren (DE); Volker Kinzig, Geinhausen (DE); Rolf Hartung, Blaubeuren (DE)

(73) Assignee: Centrotherm Clean Solutions GmbH & Xo. KG, Blaubeuren (DE)

( * ) Notice: Subject to any disclaimer, the term of this patent is extended or adjusted under 35 U.S.C. 154(b) by 257 days.

(21) Appl. No.: 11/574,932

(22) PCT Filed: Sep. 22, 2005

(86) PCT No.: PCT/DE2005/001678

§ 371 (c)(1),
(2), (4) Date: Jun. 1, 2007

(87) PCT Pub. No.: WO2006/034684

PCT Pub. Date: Apr. 6, 2006

(65) Prior Publication Data

US 2008/0095675 A1    Apr. 24, 2008

(30) Foreign Application Priority Data

Sep. 28, 2004    (DE) .................. 10 2004 047 440

(51) Int. Cl.
*B01D 50/00* (2006.01)
*B01D 53/46* (2006.01)
*B01D 53/68* (2006.01)
*B01D 53/78* (2006.01)
*F23D 14/00* (2006.01)
*F23J 15/00* (2006.01)
*F23G 7/06* (2006.01)

(52) U.S. Cl. ............... 422/168; 431/3; 431/5; 431/29; 431/32; 431/121; 431/181; 431/187; 431/190; 431/351; 110/215; 110/216

(58) Field of Classification Search .............. 431/5, 431/181, 187, 190, 351, 121, 32, 29, 3; 110/215, 110/216; 422/168

See application file for complete search history.

(56) References Cited

U.S. PATENT DOCUMENTS 5,123,836 A * 6/1992 Yoneda et al. ................ 431/5

(Continued)

FOREIGN PATENT DOCUMENTS

EP    0 702 772    1/1998

(Continued)

*Primary Examiner*—Walter D Griffin
*Assistant Examiner*—Huy-Tram Nguyen
(74) *Attorney, Agent, or Firm*—Heslin Rothenberg Farley & Mesiti P.C.

(57) ABSTRACT

An assembly is provided for purifying toxic gases from production processes by thermal conversion in a reactor chamber and subsequent treatment of reaction products with a sorption agent in a washing device in order to bind water-soluble reaction products and to elute solid reaction products. The reactor chamber has an external wall and an internal wall, the internal wall tapering at its base in the form of a funnel at a predetermined angle. A unit for thermal treatment of toxic gases is located on the reactor chamber, sealing the top of the chamber. An inner face of the internal wall of the reactor chamber comprises a film of water flowing downwards in a uniform manner. The exterior of the internal wall is surrounded by a cloak of water. A waste gas outlet and a connection for a water circuit are located at the lower end of the tapering internal wall.

16 Claims, 4 Drawing Sheets

U.S. PATENT DOCUMENTS

Figure 1:
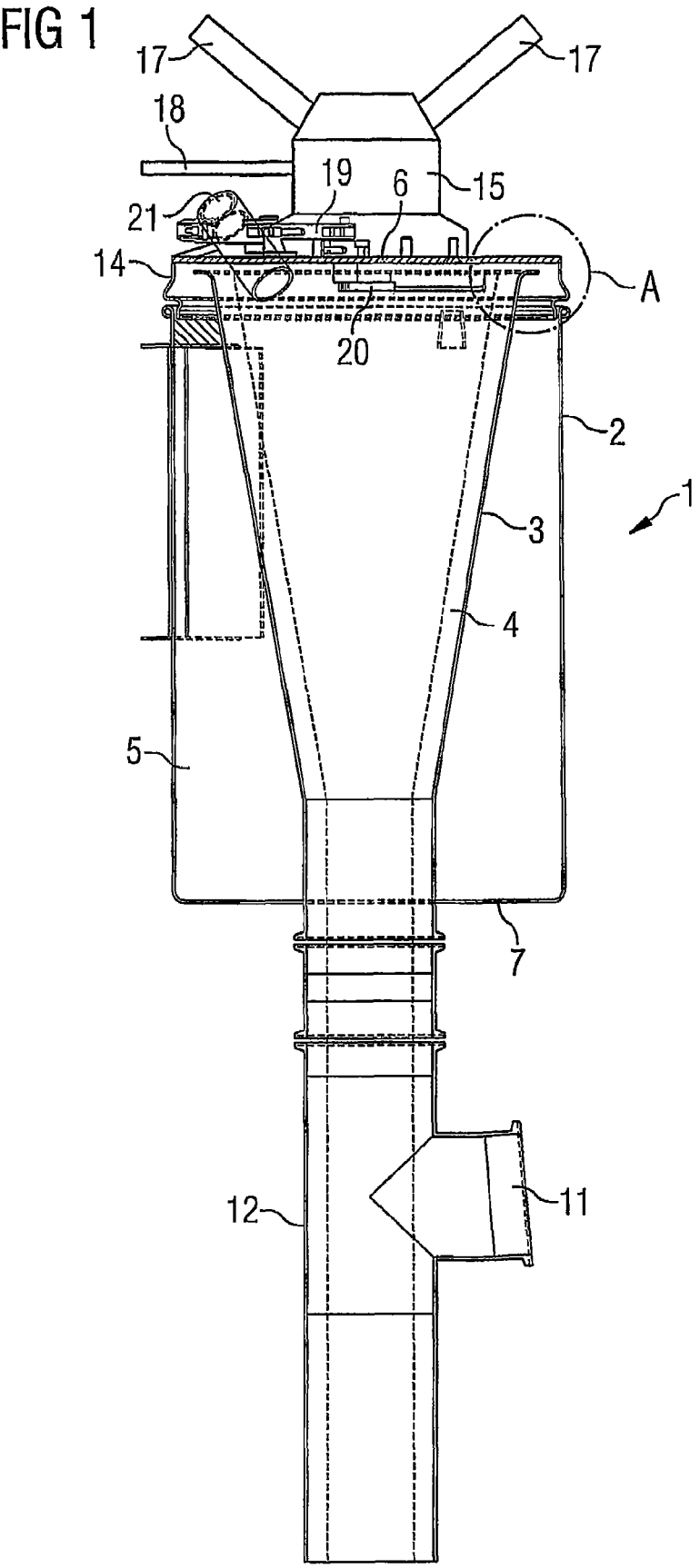

| | | | |
|---|---|---|---|
| 5,580,531 A | * 12/1996 | Vassiliou et al. | 422/108 |
| 5,591,415 A | * 1/1997 | Dassel et al. | 422/241 |
| 5,693,293 A | 12/1997 | Reichardt et al. | |
| H001709 H | * 2/1998 | Felix | 423/481 |
| 5,900,217 A | 5/1999 | Hartung et al. | |
| 7,377,771 B2 | * 5/2008 | Wiesenberg et al. | 431/190 |
| 2005/0064353 A1 | * 3/2005 | Wiesenberg et al. | 431/3 |
| 2005/0135984 A1 | * 6/2005 | Ferron et al. | 423/245.3 |
| 2005/0150440 A1 | * 7/2005 | Tanner | 110/238 |

FOREIGN PATENT DOCUMENTS

| | | |
|---|---|---|
| EP | 0 803 042 | 8/1998 |
| WO | 96/12173 | 4/1996 |
| WO | 2005/062772 A2 | 7/2005 |

* cited by examiner

ASSEMBLY FOR PURIFYING TOXIC GASES FROM PRODUCTION PROCESSES

CROSS REFERENCE TO RELATED APPLICATIONS

This application is a 371 international filing of PCT/DE2005/001678, filed Sep. 22, 2005 and published, in German, as international publication WO 2006/034684 A1 on Apr. 6, 2006, and claims priority of German Application No. 10 2004 047 440.0 filed on Sep. 28, 2004, which applications are hereby incorporated by reference herein, in their entirety.

BACKGROUND OF THE INVENTION

The invention relates to an assembly for purifying toxic gases from production processes by thermal conversion in a reactor chamber and to the subsequent treatment of the reaction products with a sorbent in a washing device in order to bind water-soluble reaction products and to elute solid reaction products.

Toxic gases of this type accumulate in large quantities, for example, in the production of semiconductor circuits and cannot be disposed in an untreated form in the environment due to their toxicity. Examples of such toxic gases are HF, $SiH_2Cl_2$, $SiCl_4$, $NH_3$, $C_2F_6$, $PH_3$, $BCl_3$, $NF_3$, etc.

It is well known that most of these waste gases from semiconductor processes or even from other different chemical processes can usually be rendered harmless by means of oxidation or thermal conversion. Usually, the thermal conversion is carried out in a flame, which is supplied with natural gas or hydrogen and air or oxygen. For this purpose, it is not necessary to supply additional reactants, with the exception of additional oxygen or air where appropriate. The thermally treated reaction products are completely harmless and are present either in gaseous or solid form or are water-soluble. The gaseous reaction products, such as water vapor or $CO_2$ can be disposed in the environment without further subsequent treatment.

It should be understood that a number of combustion processes and reactor chambers have already been developed and used in practice for thermal conversion. Thus in the [European Patent specification] EP 0 346 803 B1, an assembly for purifying waste gases has been disclosed, which assembly comprises a reactor chamber in which there is arranged, at the bottom, a burner, which is operated on the one hand with combustible gases such as hydrogen and oxygen and/or air or natural gas and air and to which on the other hand the waste gas to be purified is supplied. The reaction product arising during combustion contains both solid components, and water-soluble reaction products.

In order to be able to completely eliminate these reaction products from the exhaust gas, the reaction products arising during combustion are brought into contact with a sorbent, for example water, immediately after combustion. This is carried out by arranging, above the burner flame, a spraying device for the water, which is sprayed against the ascending gas flow of the reaction products. The spraying device can be designed in such a way that the sorbent sprayed out is not sprayed into the flame (EP 0 702 771 B1). Alternatively, a splash guard device (cone or spherical caps or the like) is arranged above the burner flame and the spraying device is arranged above this splash guard device, as shown in EP 0 346 803 B1.

The aim here is that the water-soluble reaction products are dissolved from the burner exhaust gas and that the solid components (e.g., $SiO_2$ as a reaction product of silane) are eluted from the reactor chamber. In addition, DE 196 00 873 A1 or even WO 03/085321 A1 provide for the reactor chamber to be delimited upwardly by a spray guard device and radially by means of a cylindrical wall and for the entire assembly to be encased by an external wall. Here, the solid reaction products are rinsed with the sorbent downwards along the inner face of the external wall, thus outside of the combustion chamber, and near the burner arranged at the bottom [text cut off] Here the disadvantage, in particular, is that the combustion must be carried out at relatively high temperatures and that the structural elements of the combustion chamber are thus also exposed to high temperatures or alternating thermal stress loads, thereby wearing out comparatively rapidly. Another disadvantage is that reaction products from the upwardly burning flame can get deposited in or on the burner. The consequence is a constant degradation of the effectiveness and the necessity for frequent cleaning procedures.

The latter disadvantage was eliminated to a large extent by arranging the burner nozzle at the top in the combustion chamber, as indicated in EP 0 803 042 B1 with the result that the flame burns downwardly. Deposits of solid reaction products on the burner were thus substantially reduced, thus achieving a clearly improved service life. However, the problem of the high temperature load of the reactor still persisted. The result is considerable servicing expenses.

In other waste gas purification methods, the operation involves the use of an upwardly burning flame and subsequent catalytic waste gas treatment (EP 0 736 322 B1). However, it has been shown that a concluding treatment with a sorbent is meaningful and necessary.

BRIEF SUMMARY OF THE INVENTION

It is therefore the object of the present invention to create an assembly for purifying toxic gases from production processes, said assembly achieving a highly effective purification with a high gas throughput, while at the same time obtaining a very efficient cooling of the reaction chamber.

This object of the present invention is attained in that the reactor chamber consists of an external and internal wall, the internal wall tapering at the base in the form of a funnel at a predetermined angle; a unit for the thermal treatment of the toxic gases is located on the reactor chamber, sealing the top of said chamber; the inner face of the internal wall of the reactor chamber, which internal wall tapers at the base, comprises a film of water flowing downwards in a uniform manner; the exterior of the internal wall of the reactor chamber is surrounded by a cloak of water; and a waste gas outlet and a connection for a water circuit are located at the lower end of the tapering internal wall.

In a first embodiment of the invention, the unit for the thermal treatment of the toxic waste gases is a burner with a downwardly burning flame, which burns downwardly into the reactor chamber. The burner is preferably designed as an external-mixing burner with at least one central inlet for the toxic waste gases to be treated. In order to achieve the highest possible throughput of the toxic waste gases to be treated, several inlets are provided, the nozzles for the combustible gas and the nozzles for air or oxygen surrounding said central inlets for the toxic gases.

In a second embodiment of the invention, the unit for the thermal treatment of the toxic waste gases is an electrically heated chamber, wherein several inlets for the toxic waste gases to be thermally are provided.

For the effective heating of the chamber, several heating rods are provided, which are arranged parallel to one another, and which project into the chamber, and which enable a uniform heating of the chamber space at least in the flow-through region of the toxic waste gases to be treated.

In continuation of the invention, the external and the internal wall are interconnected at the bottom by means of an annular base plate in such a way that the interspace between the internal wall and the external wall can be filled substantially completely with water, wherein the top edge of the internal wall is designed as an overflow for the water located in the interspace and that the interspace is connected to a water inlet.

Either a control system or a throttle device for the water to be supplied to the interspace is assigned to the water inlet.

In another embodiment of the invention, provision has been made for the waste gas outlet of the internal wall to be connected to a washing column, which is arranged near the reactor chamber and is filled with a filling material, in order to enable an effective subsequent treatment of the toxic gases and in order to remove the water-soluble components, in particular, from the reaction waste gas.

Provision is further made for a cooling unit for the thermally treated waste gas leaving the internal chamber, which cooling unit is arranged between the waste gas outlet and the washing column and which comprises at least one spray nozzle for water.

The spray jet of at least one spray nozzle is preferably directed against the gas flow direction.

In another embodiment of the invention, the water inlet comprises a standpipe in the interspace, said standpipe comprising a water outlet opening above the base plate of the interspace.

In order to achieve a redundancy, two reactor chambers are further provided, whose outlet openings can be linked alternatively to the washing column and a water circuit.

Finally, provision has been made for the connection for the water circuit of each reactor chamber to be connected to a water tank, which is connected to a filtering device for solid reaction products and a pump for filling the interspace.

BRIEF DESCRIPTION OF THE DRAWING FIGURES

Figure 2:
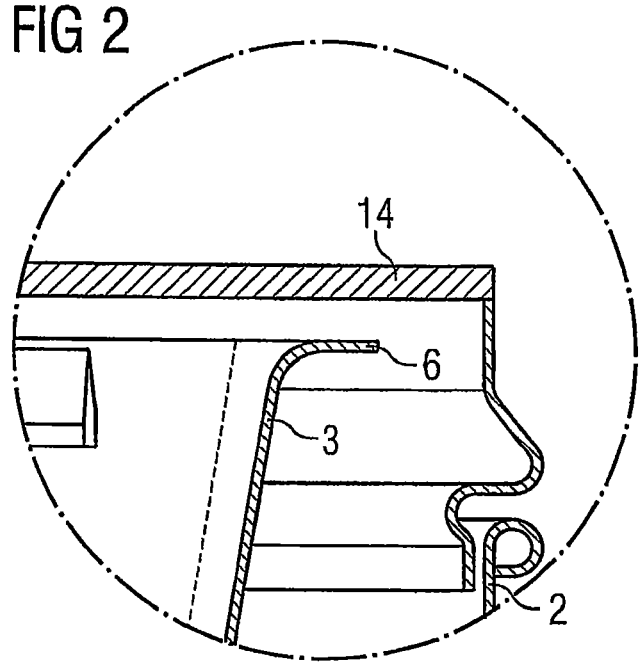
Figure 3:
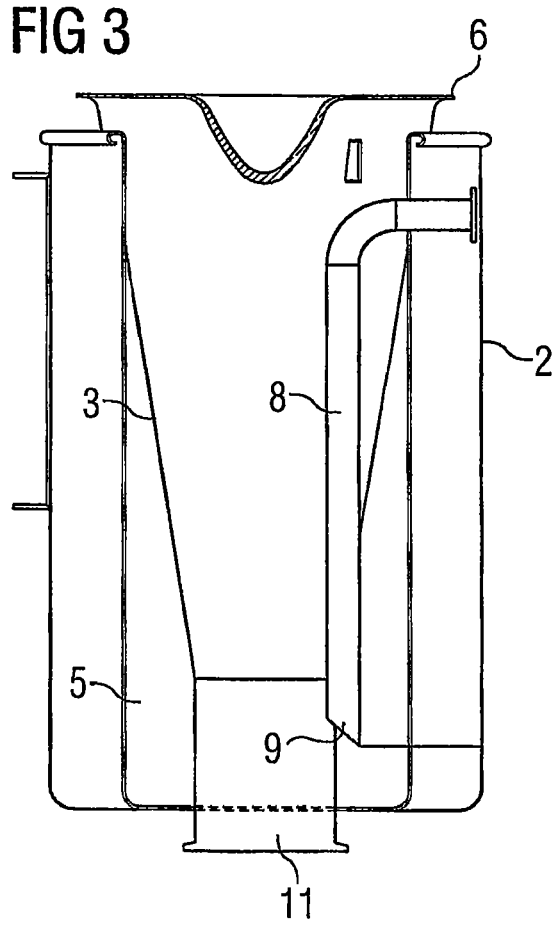
Figure 4:
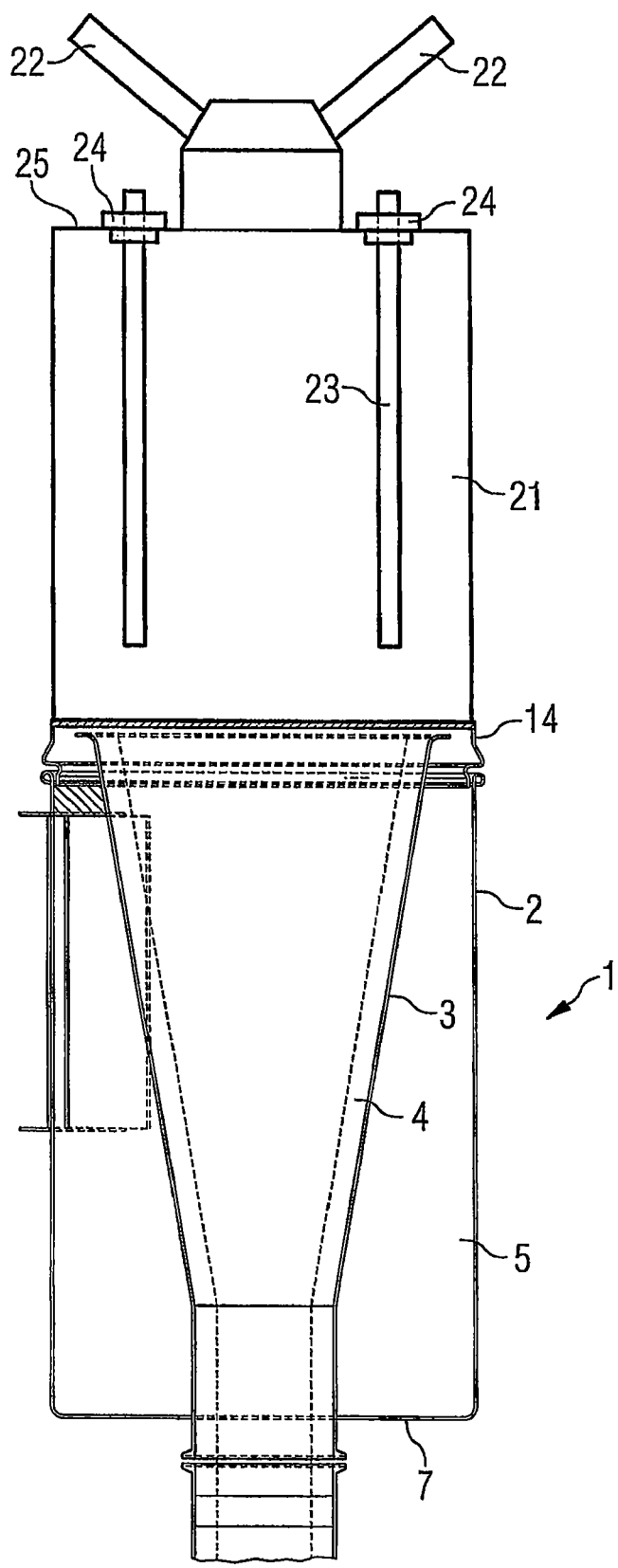
Figure 5:
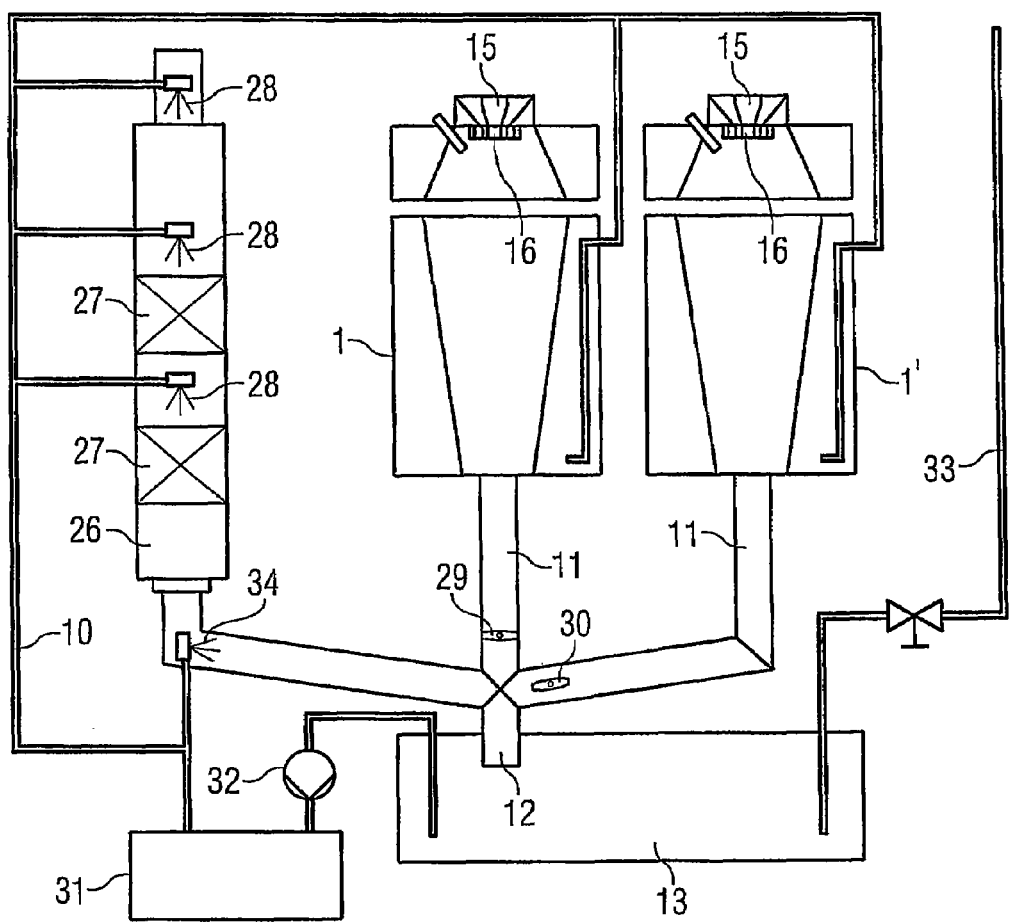

The invention will now be described in detail in the following with reference to an exemplary embodiment and the associated figures of the drawing, of which:

FIG. 1: shows a schematic sectional view of a reactor chamber with a surface-mounted burner;

FIG. 2: shows an enlarged detail A from FIG. 1;

FIG. 3: shows a schematic partial sectional view of the open reactor chamber shown in FIG. 1 with a water inlet;

FIG. 4: shows a schematic sectional view of a reactor chamber with an electrically heated reactor chamber; and FIG. 5: shows a schematic representation of an assembly for purifying toxic gases from production processes, said assembly comprising two coupled reactor chambers and an associated washing column for the subsequent treatment of the thermally treated toxic exhaust gas.

DETAILED DESCRIPTION

FIG. 1 shows a schematic sectional view of an assembly for purifying toxic gases from production processes, said assembly comprising a reactor chamber 1, which comprises an external and internal wall 2, 3. The internal wall 3 tapers at the base in the form of a funnel at a predetermined angle.

A film of water 4 flows downwards in a uniform manner on the inner face of the internal wall 3 of the reactor chamber 1 that tapers at the base. This film of water is denoted in FIG. 1 by a dashed line. In order to achieve this, a cloak of water is located in the interspace 5 between the internal wall 3 of the reactor chamber 1 and the external wall 2, water being supplied constantly in a predetermined quantity to said interspace, with the result that the supplied water can flow over the upper edge 6 of the internal wall 3 and form the film of water on the inner face of the internal wall 3.

In addition, the external and the internal wall 2, 3 are interconnected at the bottom by means of an annular base plate 7 in such a way that the interspace 5 between the internal wall 3 and the external wall 2 can be filled substantially completely with water, the upper edge 6 of the internal wall 3 being designed as an overflow for the water located in the interspace 5 (FIG. 2). The supply of the water into the interspace 5 is carried out by means of a standpipe 8, whose outlet opening 9 is located above the base plate 7 (FIG. 3). The standpipe 8 is connected to a water circuit 10, which is shown schematically in FIG. 4. A control system for the water to be supplied can be assigned in the water inlet to the standpipe 8, said control system comprising, in the simplest case, a throttle device for the water to be supplied.

A waste gas outlet 11 penetrating the base plate 7 and a connection 12, which ends in a water tank 13, are located at the lower end of the tapering internal wall 3.

A cover 14 is arranged on the reactor chamber 1 for sealing the combustion chamber 1, in that the cover 14 is tightly connected to the upper edge of the external wall 2, this connection being carried out by means of a conventional quick-release fastener. The cover 14 simultaneously serves for accommodating a burner 15 with nozzles 16 directed into the reactor chamber 1, so as to be able to generate a flame, which burns downwardly into the reactor chamber 1.

The burner 15 is preferably an external-mixing burner with a central inlet for the toxic waste gases to be treated. The supply of the exhaust gases to be treated is carried out by means of several supply lines 17 shown schematically in FIG. 1. The burner 15 is provided with nozzles for combustible gas, e.g., hydrogen or natural gas and with nozzles for air or oxygen. The corresponding combustible gas inlet 18 is shown schematically in FIG. 1. A cleaning device 19, which can be actuated externally, and a scraper 20 are provided for cleaning the burner port inside the reactor chamber 1.

The cloak of water in the interspace 5 helps achieve an overall intensive cooling of the reactor chamber 1 with the result that all the structural elements such as the internal wall 3 and external wall 2 are hardly exposed to heat. Furthermore, the film of water 4 on the inner face of the internal wall 3 ensures a strong absorption of the radiant heat of the flame. At the same time, the film of water 4 prevents deposits from forming on the inner face of the internal wall 3 and in the connection 12 for the water tank 13 and to some extent also in the waste gas outlet 11. Furthermore, a pilot burner 21 is located in the cover 14 for igniting the burner flame.

In place of the burner 15, an electrically heated chamber 21 having several inlets 22 for the toxic waste gases to be treated thermally can also be built on the reactor chamber 1 (FIG. 4). In the chamber 21 there are located several heating rods 23, which are arranged parallel to each other and project in said chamber and which are fixed by means of insulating feedthroughs 24 to the cover plate 25 of the chamber 21.

A washing column 26 is located near the reactor chamber 1 for the subsequent treatment of the reaction products with a sorbent in order to bind water-soluble reaction products and to elute solid reaction products. For this purpose, the waste gas outlet 11 of the internal wall 3 is connected to a washing column 26 (FIG. 5).

In the washing column 26 there are located a filling material 27 and several spray nozzles 28, from which a sorbent is sprayed.

A cooling unit in the form of at least one spray nozzle 34, whose spray jet is directed against the gas flow direction, is located between the waste gas outlet 11 and the washing column 26 for the purpose of cooling the waste gases leaving the reactor chamber 1.

In order to achieve a certain redundancy of the assembly according to the present invention, it is also possible to provide two reactor chambers 1, 1' whose outlet openings 11 can be linked alternatively to the washing column 26 and the water tank 13 (FIG. 5). For this purpose, throttle valves 29, 30 are arranged in the inlet pipes.

The connection 12 for the water circuit of each reactor chamber 1, 1' is connected to the water tank 13, which is linked to a filtering device 31 for solid reaction products and a pump 32 for filling the interspace 5. Furthermore, the water tank 13 can be filled by means of a water connection 33.

LIST OF REFERENCE NUMERALS

1 Reactor chamber
2 External wall
3 Internal wall
4 Film of water
5 Interspace
6 Edge
7 Base plate
8 Standpipe
9 Outlet opening
10 Water circuit
11 Waste gas outlet
12 Connection for water tank
13 Water tank
14 Cover
15 Burner
16 Nozzle
17 Inlet for toxic waste gases
18 Combustible gas inlet
19 Cleaning device
20 Scraper
21 Chamber
22 Inlet for toxic waste gases
23 Heating rod
24 Feedthrough
25 Cover plate
26 Washing column
27 Filling material
28 Spray nozzle
29 Throttle valve
30 Throttle valve
31 Filtering device
32 Pump
33 Water connection
34 Spray nozzle

The invention claimed is:

1. Assembly for purifying toxic gases from production processes by thermal conversion in a reactor chamber and to the subsequent treatment of the reaction products with a sorbent in a washing device in order to bind water-soluble reaction products and to elute solid reaction products, wherein the reactor chamber comprises an external wall and an internal wall, the internal wall tapering at a base in the form of a funnel at a predetermined angle; a unit for thermal treatment of toxic waste gases is located on the reactor chamber, sealing a top of said chamber; an inner face of the internal wall of the reactor chamber which internal wall tapers at the base comprises a film of water flowing downwards in a uniform manner, an exterior of the internal wall of the reactor chamber being surrounded by a cloak of water; and a waste gas outlet and a connection for a water circuit are located at a lower end of the tapering internal wall.

2. Assembly according to claim 1, wherein the unit for the thermal treatment of the toxic waste gases comprises a burner with a downwardly burning flame, which flame burns downwardly into the reactor chamber.

3. Assembly according to claim 2, wherein the burner comprises an external-mixing burner with at least one central inlet for the toxic waste gases to be treated.

4. Assembly according to claim 3, wherein the burner comprises several central inlets for the toxic waste gases to be treated, and nozzles for the combustible gas and nozzles for air or oxygen surrounding said central inlets.

5. Assembly according to claim 1, wherein the unit for the thermal treatment of the toxic waste gases comprises an electrically heated chamber having several inlets for the toxic waste gases to be treated thermally.

6. Assembly according to claim 5, wherein the electrically heated chamber further comprises heating rods, arranged parallel to one another, and the rods project into the chamber.

7. Assembly according to claim 1, wherein the external wall and the internal wall are interconnected at bottom by an annular base plate in such a way that an interspace between the internal wall and the external wall can be filled substantially completely with water, wherein a top edge of the internal wall provides an overflow for the water located in the interspace, and the interspace is connected to a water inlet.

8. Assembly according to claim 7, wherein a control system for the water to be supplied to the interspace is assigned to the water inlet.

9. Assembly according to claim 7, wherein a throttle device for the water to be supplied to the interspace is assigned to the water inlet.

10. Assembly according to claim 1, wherein the waste gas outlet is connected to a washing column arranged near the reactor chamber.

11. Assembly according to claim 10, wherein a cooling unit for the thermally treated waste gas leaving the reaction chamber is arranged between the waste gas outlet and the washing column.

12. Assembly according to claim 11, wherein the cooling unit comprises at least one spray nozzle for water.

13. Assembly according to claim 12, wherein a spray jet of the at least one spray nozzle is directed against a gas flow direction.

14. Assembly according to claim 7, wherein the water inlet for the interspace comprises a standpipe having a water outlet opening above the base plate.

15. Assembly according to claim 10, further comprising a second reactor wherein an outlet of each reaction chamber is linked alternatively to the washing column and the water circuit.

16. Assembly according to claim 15, wherein the connection for the water circuit of each reactor chamber is connected to a water tank, and the water tank is connected to a filtering device for solid reaction products and a pump for filling an interspace between the internal wall and the external wall.

* * * * *

UNITED STATES PATENT AND TRADEMARK OFFICE
CERTIFICATE OF CORRECTION

PATENT NO. : 7,618,595 B2  Page 1 of 1
APPLICATION NO. : 11/574932
DATED : November 17, 2009
INVENTOR(S) : Hartung et al.

It is certified that error appears in the above-identified patent and that said Letters Patent is hereby corrected as shown below:

In the Assignee name (73): Delete "Xo. KG" and insert -- Co. KG --

Signed and Sealed this

Second Day of February, 2010

David J. Kappos
*Director of the United States Patent and Trademark Office*